United States Patent
Wen et al.

(10) Patent No.: US 12,481,267 B2
(45) Date of Patent: Nov. 25, 2025

(54) PRODUCT PRODUCTION PLANNING METHOD AND DEVICE, AND STORAGE MEDIUM

(71) Applicant: BOE TECHNOLOGY GROUP CO., LTD., Beijing (CN)

(72) Inventors: Jinxiao Wen, Beijing (CN); Xibo Zhou, Beijing (CN); Jifang Hao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/252,196

(22) PCT Filed: Feb. 28, 2022

(86) PCT No.: PCT/CN2022/078496
§ 371 (c)(1),
(2) Date: May 9, 2023

(87) PCT Pub. No.: WO2023/159647
PCT Pub. Date: Aug. 31, 2023

(65) Prior Publication Data
US 2024/0369989 A1    Nov. 7, 2024

(51) Int. Cl.
*G05B 19/40* (2006.01)
*G05B 19/4093* (2006.01)
(Continued)

(52) U.S. Cl.
CPC ...... *G05B 19/40937* (2013.01); *G05B 19/418* (2013.01); *G05B 2219/32082* (2013.01);
(Continued)

(58) Field of Classification Search
None
See application file for complete search history.

(56) References Cited

U.S. PATENT DOCUMENTS

| | | | | |
|---|---|---|---|---|
| 4,619,550 A | * | 10/1986 | Jeppson | E01C 19/1004 404/81 |
| 5,216,593 A | * | 6/1993 | Dietrich | G06Q 10/0875 700/36 |

(Continued)

FOREIGN PATENT DOCUMENTS

| | | | | |
|---|---|---|---|---|
| CA | 2803443 A1 | * | 7/2014 | G09B 7/00 |
| CN | 109978369 A | * | 7/2019 | G06Q 10/06311 |

(Continued)

OTHER PUBLICATIONS

Shen et al., "Agent-Based Distributed Manufacturing Process Planning and Scheduling: A State-of-the-Art Survey", Dec. 2003, IEEE Transactions On Systems, Man, and Cybernetics—Part C: Applications and Reviews, vol. 36, No. 4. (Year: 2003).*

(Continued)

*Primary Examiner* — Mohammad Ali
*Assistant Examiner* — Kelvin Booker
(74) *Attorney, Agent, or Firm* — Dority & Manning, P.A.

(57) ABSTRACT

A product production planning method includes: determining material types of materials, the material types including a first type of old materials and a first type of new materials; determining a production plan of products to be produced based on the old materials of the first type and the new materials of the first type included in the materials, according to a linear programming model and the material types; wherein the linear programming model includes a constraint condition and an objective function; the production plan includes a first-stage production plan and a second-stage production plan, the first-stage production plan is a production plan for producing products to be produced according to the old materials of the first type, and the second-stage production plan is a production plan for producing products (Continued)

to be produced according to the new materials of the first type.

15 Claims, 6 Drawing Sheets

(51) Int. Cl.
*G06Q 10/06* (2023.01)
*G06Q 50/04* (2012.01)
*H04L 47/76* (2022.01)
*G05B 19/418* (2006.01)
*G06Q 10/08* (2023.01)

(52) U.S. Cl.
CPC ............ *G06Q 10/06* (2013.01); *G06Q 10/08* (2013.01); *G06Q 50/04* (2013.01); *H04L 47/76* (2013.01)

(56) References Cited

U.S. PATENT DOCUMENTS

| | | | | |
|---|---|---|---|---|
| 5,548,518 | A * | 8/1996 | Dietrich | G06Q 10/06 |
| | | | | 700/100 |
| 5,819,232 | A * | 10/1998 | Shipman | G06Q 30/0202 |
| | | | | 705/7.31 |
| 5,946,662 | A * | 8/1999 | Ettl | G06Q 20/203 |
| | | | | 705/22 |
| 5,970,465 | A * | 10/1999 | Dietrich | G06Q 10/06 |
| | | | | 705/7.22 |
| 10,698,693 | B1 * | 6/2020 | Zhang | G06F 17/12 |
| 2001/0004520 | A1 * | 6/2001 | Nomoto | G06Q 10/0631 |
| | | | | 434/109 |
| 2003/0167146 | A1 * | 9/2003 | Tezuka | G06Q 10/087 |
| | | | | 702/129 |
| 2004/0230475 | A1 * | 11/2004 | Dogan | G06Q 10/06 |
| | | | | 705/7.31 |
| 2006/0052895 | A1 * | 3/2006 | Woehler | G06Q 10/08 |
| | | | | 700/107 |
| 2012/0054076 | A1 * | 3/2012 | Wu | G06Q 10/087 |
| | | | | 705/28 |
| 2019/0243347 | A1 * | 8/2019 | Kato | G06Q 10/06 |
| 2019/0347606 | A1 * | 11/2019 | Malecha | G06Q 30/0223 |
| 2021/0373902 | A1 * | 12/2021 | Zhang | G06F 9/5061 |
| 2022/0360542 | A1 * | 11/2022 | Colena | H04L 47/762 |

FOREIGN PATENT DOCUMENTS

| | | | | |
|---|---|---|---|---|
| CN | 112132546 A | * | 12/2020 | ......... G06Q 10/103 |
| CN | 113627745 A | * | 11/2021 | ............. G06Q 50/04 |
| JP | 2001233414 A | * | 8/2001 | ......... G06Q 10/0631 |
| JP | 2006099283 A | * | 4/2006 | ........... G05B 19/418 |
| JP | 2018120342 A | * | 8/2018 | ............ G06Q 50/04 |
| WO | WO-2021168783 A1 | * | 9/2021 | ......... G05B 19/0426 |

OTHER PUBLICATIONS

Zhai et al., "Optimization Based Production Planning With Hybrid Dynamics and Constraints", Nov. 2007, IEEE Transactions on Automatic Control, vol. 55, No. 12. (Year: 2007).*

Wang et al., "Advanced Production Plan System of Military Manufacturing Enterprises Based on Linear Programming Model", 2021, Journal of Physics: Conf. Ser. 1732 012017. (Year: 2021).*

Fernandes et al., "Product mix strategy and manufacturing flexibility", Sep. 2011, Journal of Manufacturing Systems 31 ( 2012) 301-311. (Year: 2011).*

Ginting et al., "Product mix optimization on multi-constraint production planning—a Fuzzy Mixed Integer Linear Goal Programming (FMILGP) approach: A single case study", MATEC Web of Conferences 204, 02004 (2018). (Year: 2018).*

* cited by examiner

PRODUCT PRODUCTION PLANNING METHOD AND DEVICE, AND STORAGE MEDIUM

CROSS-REFERENCE TO RELATED APPLICATION

This application is a national phase entry under 35 USC 371 of International Patent Application No. PCT/CN2022/078496 filed on Feb. 28, 2022, which is incorporated herein by reference in its entirety.

TECHNICAL FIELD

The present disclosure relates to the field of data processing, and in particular, to a product production planning method, a product production planning device and a storage medium.

BACKGROUND

In order to improve the utilization rate of old materials and reduce production costs, when materials for products to be produced are planned, there is a need to give priority to planning old materials for the products to be produced, and ensure that the old materials are used first to produce products in the production process of the products. But currently there is a lack of a production planning method that can preferentially allocate old materials for products to be produced.

SUMMARY

In an aspect, a product production planning method is provided. The method includes: determining material types of materials, the material types including a first type of old materials and a first type of new materials; determining a production plan of products to be produced based on the old materials of the first type and the new materials of the first type included in the materials, according to a linear programming model and the material types. The linear programming model includes a constraint condition and an objective function. The production plan includes a first-stage production plan and a second-stage production plan, the first-stage production plan is a production plan for producing products to be produced according to the old materials of the first type, and the second-stage production plan is a production plan for producing products to be produced according to the new materials of the first type.

In some embodiments, the material types further include a second type of old materials, a second type of new materials and a third type of new materials. The method further includes: determining whether new materials in the materials are able to be replaced by old materials; dividing the materials into the old materials of the first type and the new materials of the first type in a case where new materials in the materials are able to be replaced by the old materials of the first type; determining that the materials include the old materials of the second type and the new materials of the third type in a case where new materials in the materials are able to be replaced by the old materials of the second type; and determining that the materials include the new materials of the second type in a case where new materials in the materials are unable to be replaced by old materials.

In some embodiments, the constraint condition includes at least one of a first constraint condition on a product production output of first sub-products, a second constraint condition on a material consumption of the first sub-products, a third constraint condition on a product output of second sub-products, and a fourth constraint condition on a material consumption of the second sub-products. The first sub-products are products planned to be produced in the first-stage production plan; the second sub-products are products planned to be produced in the second-stage production plan.

In some embodiments, the first constraint condition on the product production output of the first sub-products satisfies the formula:

$$0 \le \sum_{m=1}^{k_1} x_m \le p_{lmax};$$

where $p_{lmax}$ represents a product demand quantity of an l-th type of products in the products to be produced, $k_1$ represents a number of types of the first sub-products corresponding to the l-th type of products, m is an m-th type of first sub-products corresponding to the l-th type of products, and $x_m$ is an output of the m-th type of first sub-products; m is less than or equal to $k_1$ ($m \le k_1$), and m and $k_1$ are positive integers.

The second constraint condition on the material consumption of the first sub-products satisfies the formula:

$$0 \le \sum_{m=1}^{n_1} a_{mq} * x_m \le m_{qmax};$$

where $n_1$ is used to represent a number of types of the first sub-products; $a_{mq}$ represents a quantity of a q-th type of materials consumed by the m-th type of first sub-products, and $m_{qmax}$ is a supply of the q-th type of materials; and q is a positive integer.

In some embodiments, the third constraint condition on the product output of the second sub-products satisfies the formula:

$$0 \le \sum_{t=1}^{k_2} x_t \le p_{lmax} - r_l;$$

where $k_2$ represents a number of types of the second sub-products corresponding to the l-th type of products, t is a t-th type of second sub-products corresponding to the l-th type of products, $x_t$ is an output of the t-th type of second sub-products, and $r_l$ is an output of the first sub-products corresponding to the l-th type of products to be produced in the first-stage production plan.

The fourth constraint condition on the material consumption of the second sub-products satisfies the formula:

$$0 \le \sum_{t=1}^{n_2} a_{tq} * x_t \le m_{qmax} - s_q;$$

where $n_2$ is used to represent a number of types of the second sub-products, $a_{tq}$ is used to represent a quantity of a q-th type of materials consumed by the t-th type of second sub-products, and so is a consumption of a q-th type of materials required to produce the first subproducts in the first-stage production plan.

In some embodiments, the objective function is an objective function that maximizes a product output of first sub-products and maximizes a product output of second sub-products. The first sub-products are products planned to be produced in the first-stage production plan; and the second sub-products are products planned to be produced in the second-stage production plan.

In some embodiments, the objective function satisfies the formula:

$$obj = \max \sum_{i=1}^{n_1} w_i * x_i + \max \sum_{j=1}^{n_2} w_j * x_j;$$

where obj is an output of the products to be produced, and $n_1$ is used to represent a number of types of the first sub-products; i represents an i-th type of first sub-products, $x_i$ is an output of the i-th type of first sub-products, and $w_i$ is a weight value of the i-th type of first sub-products; $n_2$ is used to represent a number of types of the second sub-products; j represents a j-th type of second sub-products; $w_j$ is a weight value of the j-th type of second sub-products, and $x_j$ is an output of the j-th type of second sub-products; i is less than or equal to $n_1$ ($i \leq n_1$), j is less than or equal to $n_2$ ($j \leq n_2$); i and j are positive integers.

In some embodiments, the linear programming model is a mixed-integer linear programming model.

In some embodiments, determining the production plan of the products to be produced according to the linear programming model and the material types includes: determining first sub-products and second sub-products according to the material types, the first sub-products being products planned to be produced in the first-stage production plan, and the second sub-products being products planned to be produced in the second-stage production plan; allocating materials for the first sub-products according to the linear programming model to determine the first-stage production plan; updating constraint conditions of the linear programming model according to the first-stage production plan; and allocating materials for the second sub-products according to the updated linear programming model to determine the second-stage production plan.

In some embodiments, determining the first sub-products according to the material types includes: determining materials required in a first stage, the materials required in the first stage including at least one type of the old materials of the first type, new materials of a second type, and target materials; combining the materials required in the first stage to determine a plurality of first material formulas; and determining that in the products to be produced, products to be produced that have a same material formula as any one of the first material formulas are the first sub-products.

In some embodiments, determining the second sub-products according to the material types includes: determining materials required in a second stage, the materials required in the second stage including the new materials of the first type, or the materials required in the second stage including the new materials of the first type and at least one type of the new materials of the second type and the target materials; combining the materials required in the second stage to determine a plurality of second material formulas; and determining that in the products to be produced, products to be produced that have a same material formula as any one of the second material formulas are the second sub-products.

In some embodiments, updating the constraint conditions of the linear programming model according to the first-stage production plan includes: determining an output of the first sub-products and a material consumption of the first sub-product in the first-stage production plan; determining a third constraint condition on a product output of the second sub-products according to the output of the first sub-products in the first-stage production plan; and determining a fourth constraint condition on a material consumption of the second sub-products according to the material consumption of the first sub-products in the first-stage production plan.

In another aspect, a product production planning device is provided. The product production planning device includes a processing unit configured to determine material types of materials. The material types include a first type of old materials and a first type of new materials. The processing unit is further configured to determine a production plan of products to be produced based on the old materials of the first type and the new materials of the first type included in the materials, according to a linear programming model and the material types. The linear programming model includes a constraint condition and an objective function. The production plan includes a first-stage production plan and a second-stage production plan, the first-stage production plan is a production plan for producing products to be produced according to the old materials of the first type, and the second-stage production plan is a production plan for producing product to be produced according to the new materials of the first type.

In some embodiments, the processing unit is configured to: determine first sub-products and second sub-products according to the material types, the first sub-products being products planned to be produced in the first-stage production plan, and the second sub-products being products planned to be produced in the second-stage production plan; allocate materials for the first sub-products according to the linear programming model to determine the first-stage production plan; update constraint conditions of the linear programming model according to the first-stage production plan; and allocate materials for the second sub-products according to the updated linear programming model to determine the second-stage production plan.

In yet another aspect, a product production planning device is provided. The product production planning device includes a processor and a memory for storing instructions executable by the processor. The processor is configured to execute the instructions to implement the product production planning method according to any one of the above embodiments.

In yet another aspect, a non-transitory computer-readable storage medium is provided. The computer-readable storage medium has stored thereon computer program instructions that, when run on a computer (e.g., the product production planning device), cause the computer to execute the product production planning method according to any one of the above embodiments.

In yet another aspect, a computer program product is provided. The computer program product includes computer program instructions that, when executed on a computer (e.g., the product production planning device), cause the computer to execute the product production planning method according to any one of the above embodiments.

It will be noted that all or part of the computer instructions may be stored on a computer-readable storage medium. The computer-readable storage medium may be packaged together with the processor of the device, or may be packaged separately with the processor of the device, which is not limited in the present disclosure.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, and are not limitations on actual sizes of products, actual processes of methods or actual timings of signals involved in the embodiments of the present disclosure.

DETAILED DESCRIPTION

Figure 1:
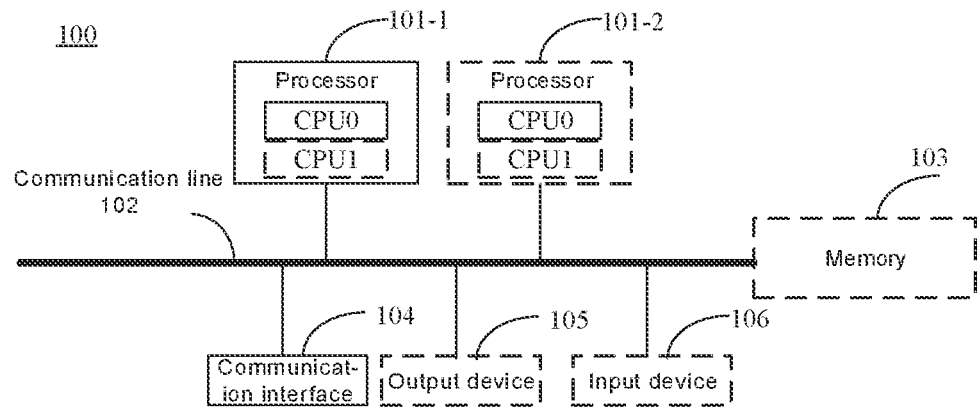
FIG. 1 is a schematic diagram showing a hardware structure of a product production planning device, in accordance with embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "an example", "a specific example" or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "coupled" and "connected" and their derivatives may be used. For example, the term "connected" may be used in the description of some embodiments to indicate that two or more elements are in direct physical or electrical contact with each other. For another example, the term "coupled" may be used in the description of some embodiments to indicate that two or more elements are in direct physical or electrical contact. However, the term "coupled" or "communicatively coupled" may also mean that two or more elements are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined" or "if [a stated condition or event] is detected" is optionally construed as "in a case where it is determined" or "in response to determining" or "in a case where [the stated condition or event] is detected" or "in response to detecting [the stated condition or event]", depending on the context.

The phrase "applicable to" or "configured to" used herein means an open and inclusive meaning, which does not exclude devices that are applicable to or configured to perform additional tasks or steps.

In addition, the phrase "based on" used is meant to be open and inclusive, since a process, step, calculation or other action that is "based on" one or more of the stated conditions or values may, in practice, be based on additional conditions or values other than those stated.

The term "about", "substantially" or "approximately" as used herein includes a stated value and an average value within an acceptable range of deviation of a particular value. The acceptable range of deviation is determined by a person of ordinary skill in the art in view of measurement in question and errors associated with measurement of a particular quantity (i.e., limitations of the measurement system).

In order to realize a product production planning method provided in embodiments of the present disclosure, embodiments of the present disclosure provide a product production planning device for executing the product production planning method. The product production planning device may be a product production planning device involved in the embodiments of the present disclosure, or a module in the product production planning device; alternatively, the product production planning device may be a chip in the product production planning device, or may be other device for executing the product production planning method, which is not limited in the present disclosure.

FIG. 1 is a schematic diagram showing a structure of a product production planning device provided in embodiments of the present disclosure. As shown in FIG. 1, the product production planning device 100 includes: at least one processor 101, a communication line 102, and at least one communication interface 104.

The product production planning device 100 may further include a memory 103. The processor 101, the memory 103 and the communication interface 104 may be connected through the communication line 102.

The processor 101 may be a central processing unit (CPU), or an application specific integrated circuit (ASIC), or one or more integrated circuits configured to implement the embodiments of the present disclosure, e.g., one or more digital signal processors (DSPs), or one or more field programmable gate arrays (FPGAs).

The communication line 102 may include a communication path for transmitting information between the components.

The communication interface 104 is used to communicate with other device or communication network (e.g., Ethernet, radio access network (RAN), or wireless local area network (WLAN)) through any device such as a transceiver.

The memory 103 may be a read-only memory (ROM) or other static storage device that can store static information and instructions, or a random access memory (RAM) or other dynamic storage device that can store information and instructions, or may be an electrically erasable programmable read-only memory (EEPROM), a compact disc read-only memory (CD-ROM) or other optical disc storage, optical disc storage (including compact disc, laser disc, optical disc, digital versatile disc, Blu-ray disc, or the like), a magnetic disk storage medium or other magnetic storage device, or any other medium capable of including or storing desired program codes in the form of instructions or data structures and being accessed by a computer, which is not limited thereto.

In a possible design, the memory 103 may be separated from the processor 101. That is, the memory 103 may be a memory outside the processor 101. In this case, the memory 103 may be connected to the processor 101 through the communication line 102, and the memory 103 is used for storing execution instructions or application program codes, and is controlled and executed by the processor 101 to implement the product production planning method provided in the following embodiments of the present disclosure. In another possible design, the memory 103 may be integrated into the processor 101. That is, the memory 103 may be an internal memory of the processor 101. For example, the memory 103 is a cache, which may be used to temporarily store some data and instruction information.

As an implementation, the processor 101 may include one or more CPUs, such as CPU0 and CPU1 in FIG. 1. As another implementation, the product production planning device 100 may include a plurality of processors, such as the processor 101-1 and processor 101-2 in FIG. 1. As yet another implementation, the product production planning device 100 may further include an output device 105 and an input device 106.

It will be pointed out that the embodiments of the present disclosure may be mutually referenced. For example, for the same or similar steps, method embodiments, system embodiments, and device embodiments may be referenced to one another, which is not limited.

In the related art, before a factory (e.g., a discrete manufacturing factory) produces products, it is first necessary to formulate a production scheduling plan based on the production demand of the products and the quantity of materials used to produce the products, and to make a material allocation plan for the products according to existing materials in stock, so as to ensure the maximum output of the products in a case where the quantity of materials in stock is certain. After the production scheduling and material planning are completed, it is also possible to supplement materials or control use of the materials according to the shortage of the materials in a case of insufficient materials in stock.

In the process of producing products, due to the inconsistency between the demand quantity of materials of the products and the quantity of materials in stock, old materials (e.g., the materials that are not used) are remained accordingly after the production of a certain batch of products is completed. In order to improve the utilization rate of the old materials and reduce production costs, when materials for products to be produced are planned, there is a need to plan the old materials for the products to be produced first, and ensure that the old materials are used first to produce products in the production process of products.

For example, in the current production of liquid crystal displays (LCDs), in order to save materials, there is a need to give priority to planning old materials for the products when materials for the LCD products are planned. However, at present, when the old materials are planned for the LCD products, the materials are generally planned in a manual planning manner. Such manner of manually planning materials cannot ensure that the old materials are preferentially planned for the products, so that the maximum output of products to be produced cannot be ensured.

In order to solve the technical problem existing in the product planning in the related art, embodiments of the present disclosure provide a product production planning method, where the product production planning device first divides materials into old materials of a first type and new materials of a first type, and determines a first-stage production plan according to the old materials of the first type, and determines a second-stage production plan according to the new materials of the first type.

Based on this, according to the method provided in the embodiments of the present disclosure, when the material planning is performed, the old materials of the first type can be allocated preferentially to products to be produced in the first-stage production plan, and after the allocation of the old materials of the first type is completed, new materials are allocated to products to be produced in the second-stage production plan. Thus, the priority allocation of the old materials is ensured.

Figure 2:
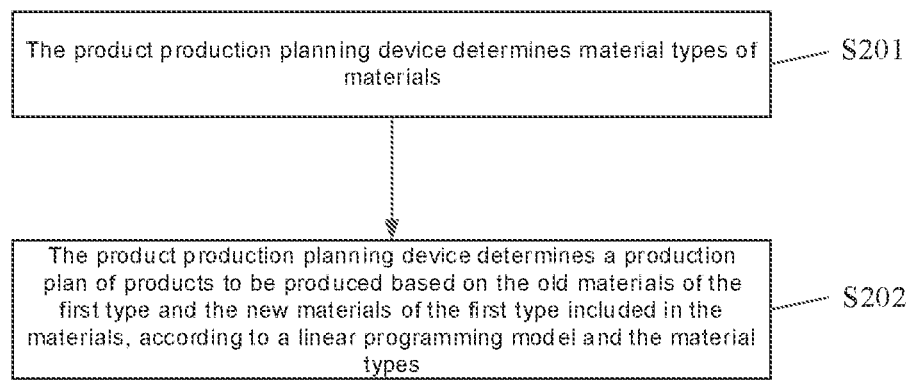
FIG. 2 is a flow diagram of a product production planning method, in accordance with embodiments of the present disclosure.

FIG. 2 shows a product production planning method provided in embodiments of the present disclosure. The method is applied to the product production planning device shown in FIG. 1, and the method includes S201 and S202.

In S201, the product production planning device determines material types of materials.

The material types include a first type of old materials and a first type of new materials. The old materials of the first type are old materials used to produce specified products. The new materials of the first type are materials that can be replaced by the old materials of the first type.

In a possible implementation, the material types further includes a second type of old materials, a second type of new materials, and a third type of new materials. The old materials of the second type are old materials used to produce a variety of products. The new materials of the second type are new materials for which there is no substitute material. The new materials of the third type are new materials that can be replaced by the old materials of the second type.

In this case, S201 may be implemented in the following manners.

The product production planning device determines whether new materials in the materials can be replaced by old materials.

In a situation a, in a case where new materials in the materials can be replaced by the old materials of the first type, the product production planning device divides the materials into the old materials of the first type and the new materials of the first type.

In a situation b, in a case where new materials in the materials can be replaced by the old materials of the second type, the product production planning device determines that the materials include the old materials of the second type and the new materials of the third type.

In a situation c, in a case where new materials in the materials cannot be replaced by old materials, the product production planning device determines that the materials include the new materials of the second type.

It will be pointed out that the product production planning device may also determine the material types of the materials by other ways, such as manual labeling, which is not limited in the present disclosure.

It will be noted that the old material of the first type may also be referred to as a pure old material, and the old material of the second type may also be referred to as a conventional old material.

In S202, the product production planning device determines a production plan of products to be produced based on the old materials of the first type and the new materials of the first type included in the materials, according to a linear programming model and the material types.

The linear programming model includes constraint condition(s) and an objective function.

The production plan includes a first-stage production plan and a second-stage production plan, the first-stage production plan is a production plan for producing products to be produced according to the old materials of the first type, and the second-stage production plan is a production plan for producing products to be produced according to the new materials of the first type.

In a possible implementation, the product production planning device determines the first-stage production plan based on the old materials of the first type, the new materials of the second type, the old materials of the second type, and the new materials of the third type. The product production planning device determines the second-stage production plan based on the new materials of the first type, the new materials of the second type, the old materials of the second type, and the new materials of the third type.

The above scheme brings at least the following beneficial effects. The embodiments of the present disclosure provide the product production planning method, in which the product production planning device divides the materials into the old materials of the first type and the new materials of the first type, and after that, the product production planning device determines the first-stage production plan according to the old materials of the first type, and determines the second-stage production plan according to the new materials of the first type. Based on this, the method provided in the embodiments of the present disclosure can preferentially allocate the old materials of the first type to products to be produced in the first-stage production plan when the material planning is performed, and then allocate the new materials of the first type to products to be produced in the second-stage production plan after the allocation of the old materials of the first type is completed. As a result, the priority allocation of the old materials of the first type is ensured.

In the following, a process of determining the material types by the product production planning device will be described in detail in combination with S201.

Figure 3:
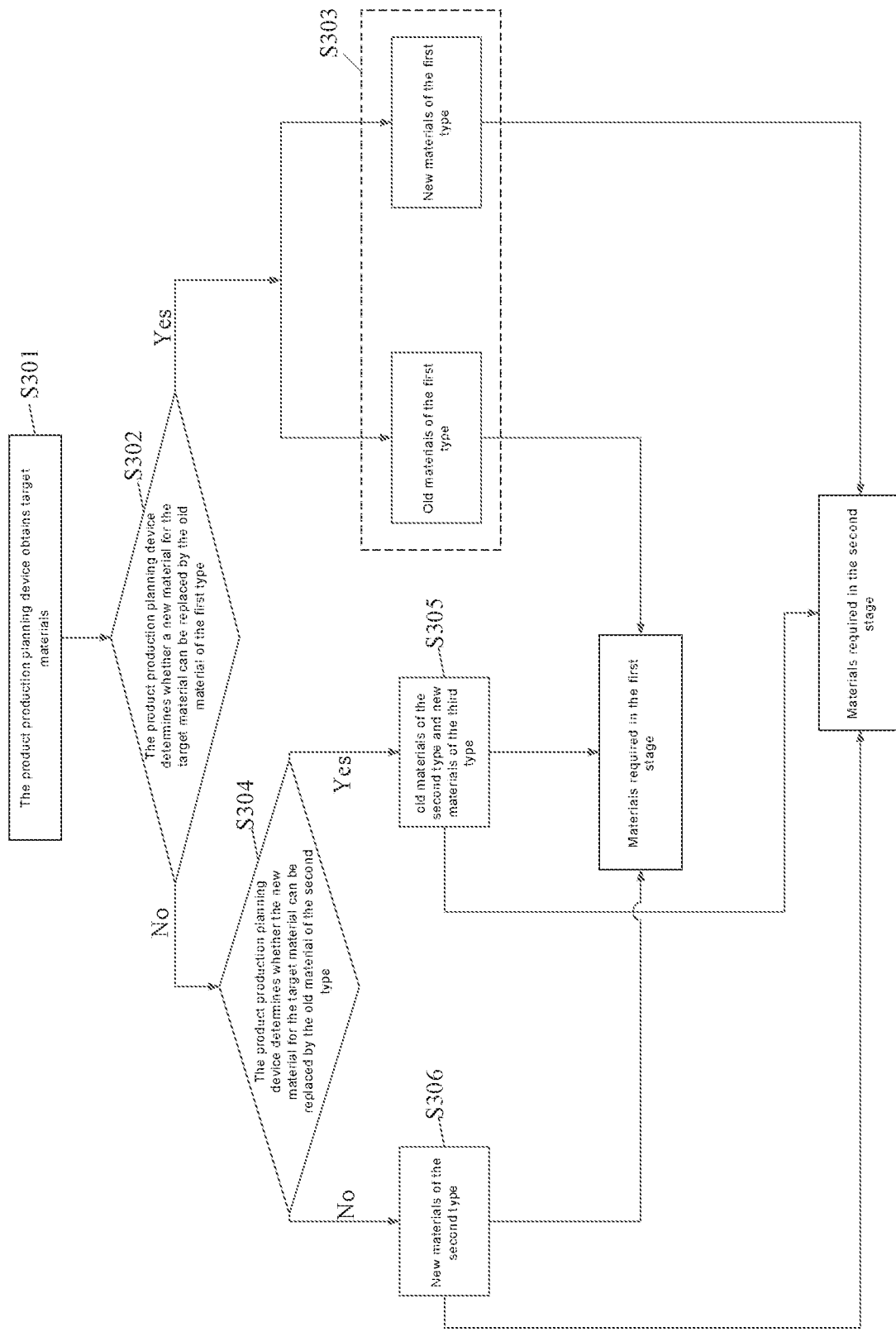
FIG. 3 is a flow diagram of another product production planning method, in accordance with embodiments of the present disclosure.

In combination with FIG. 2, as shown in FIG. 3, S201 may be implemented through the following S301 to S306.

In S301, the product production planning device obtains target materials.

The target materials are any one of at least one type of materials required to produce products to be produced.

In an example, materials of the products to be produced are shown in Table 1 and Table 2 below, and the target materials are materials in any row in Table 1 or Table 2.

TABLE 1

| Product number | Conventional material number | Old material | Unit consumption | Product constraint | Material constraint | Old material constraint | Product weight w |
|---|---|---|---|---|---|---|---|
| PRO-1 | mat-1 | oldmat-1 | 1 | 12000 | 3000 | 8000 | 1.5 |
| PRO-1 | mat-2 | | 2 | 12000 | 2000 | | 1.5 |

TABLE 2

| Product number | Conventional material number | Old material | Unit consumption | Product constraint | Material constraint | Old material constraint | Product weight w |
|---|---|---|---|---|---|---|---|
| PRO-2 | mat-3 | oldmat-2 | 1 | 12000 | 3000 | 5000 | 1.3 |
| PRO-2 | mat-4 | normalmat-1 | 1 | 12000 | 4000 | 5000 | 1.3 |

The product number is used to distinguish different types of products to be produced. For example, the product number of LCDs of a type A is PRO-1, and the product number of LCDs of a type B is PRO-2.

The conventional material number represents a conventional material required by the product to be produced. Each row of data corresponds to a type of materials required by the products to be produced.

The old material is used to represent whether there is an old material (the old material may also be referred to as a substitute material) for the conventional material of the product to be produced. If there is the old material, the old material may replace the conventional material to produce the product to be produced. The oldmat represents the old material of the first type (i.e., the pure old material), and the normalmat represents the old material of the second type (i.e., the conventional old material).

The unit consumption is used to represent the quantity of materials (the conventional materials or the old materials) consumed to produce a single product to be produced.

The product constraint is used to represent the demand quantity of products (e.g., $p_{lmax}$ in the following formula 1). The material constraint is used to represent the quantity of supplied conventional materials (e.g., $m_{qmax}$ in the following formula 2). The old material constraint is used to represent the quantity of supplied old materials.

The product weight (e.g., $w_i$ or $w_j$ in Formula 5 below) is used to represent the importance of different types of products to be produced. The greater the importance of products, the greater the weight of the products, and the greater the weight of the products, the greater the impact of the output of the products on the total output of products. It will be pointed out that, in a case where the weight is assigned to products, the product weight is included in Table 1. In a case where no weight is assigned to the products, the product weight may not be included in Table 1, which is not limited in the present disclosure.

In S302, the product production planning device determines whether a new material for the target material can be replaced by the old material of the first type.

In a possible implementation, in a case where the old material of the first type is the pure old material, the step is specifically that, the product production planning device determines whether the target material can be replaced by the pure old material.

For example, in combination with the material of the product PRO-1 in the first row in Table 1, the product production planning device determines that the new material mat-1 for this material can be replaced by the old material oldmat-1 of the first type.

In combination with the material of the product PRO-1 in the second row in Table 1, the product production planning device determines that the new material mat-2 for this material cannot be replaced by the old material of the first type.

In combination with the material of the product PRO-2 in the first row in Table 2, the product production planning device determines that the new material mat-3 for this material can be replaced by the old material oldmat-2 of the first type.

In combination with the material of the product PRO-2 in the second row in Table 2, the product production planning device determines that the new material mat-4 for this material cannot be replaced by the old material of the first type.

It will be pointed out that whether there is the old material of the first type for the substitute material of the target material includes the following situations 1 and 2. In situation 1, the new material for the target material can be replaced by the old material of the first type; in situation 2, the new material for the target material cannot be replaced by the old material of the first type. In different situations, the actions performed by the product production planning device are different, which are described below.

In situation 1, the new material for the target material can be replaced by the old material of the first type.

In situation 1, the product production planning device executes S303.

In S303, the product production planning device divides the target materials into the old materials of the first type and the new materials of the first type.

That is, in a case where the new material for the target material can be replaced by the old material of the first type, the product production planning device divides the target materials into the old materials of the first type and the new materials of the first type.

For example, the new material for the material in the first row in Table 1 and the new material for the material in the first row in Table 2 each can be replaced by the old material of the first type.

For the materials of the products PRO-1 in the first row in Table 1, the product production planning device divides the materials into the following two types of materials in Table 3 (the old materials of the first type) and Table 4 (the new materials of the first type). The old materials of the first type in Table 3 are allocated to first sub-products in the first-stage production plan. The new materials of the first type in Table 4 are allocated to second sub-products in the second-stage production plan.

TABLE 3

| Product number | Old material | Unit consumption | Product constraint | Old material constraint | Product weight w |
|---|---|---|---|---|---|
| PRO-1 | oldmat-1 | 1 | 12000 | 8000 | 1.5 |

TABLE 4

| Product number | Conventional material number | Unit consumption | Product constraint | Material constraint | Product weight w |
|---|---|---|---|---|---|
| PRO-1 | mat-1 | 1 | 12000-Z | 3000 | 1.5 |

Z represents the product output of the products in the first-stage production plan.

For the materials of the products PRO-2 in the first row in Table 2, the product production planning device divides the materials in the first row into the following two types of materials in Table 5 (the old materials of the first type) and Table 6 (the new materials of the first type). The old materials of the first type in Table 5 are allocated to first sub-products in the first-stage production plan. The new materials of the first type in Table 6 are allocated to the second sub-products in the second-stage production plan.

TABLE 5

| Product number | Old material | Unit consumption | Product constraint | Old material constraint | Product weight w |
|---|---|---|---|---|---|
| PRO-2 | oldmat-2 | 1 | 12000 | 5000 | 1.3 |

TABLE 6

| Product number | Conventional material number | Unit consumption | Product constraint | Material constraint | Product weight w |
|---|---|---|---|---|---|
| PRO-2 | mat-3 | 1 | 12000-Z | 3000 | 1.3 |

In the above method, the product production planning device divides the materials in which the new material can be replaced by the old material of the first type into the old materials of the first type and the new materials of the first type, so as to facilitate the product production planning device to allocate different materials for different stages of production plans in the production planning process.

In situation 2, the new material for the target material cannot be replaced by the old material of the first type.

In this case, the product production planning device may execute S304 to S306 to determine the material types of the target materials.

In S304, the product production planning device determines whether the new material for the target material can be replaced by the old material of the second type.

That is to say, in a case where the new material for the target material cannot be replaced by the old material of the first type, the product production planning device determines whether the new material for the target material can be replaced by the old material of the second type.

For example, in combination with the material of the product PRO-1 in the second row in Table 1, the product production planning device determines that the new material for the material cannot be replaced by the old material of the second type.

In combination with the material of the product PRO-2 in the second row in Table 2, the product production planning device determines that the new material for the material can be replaced by the old material of the second type.

It will be pointed out that whether the new material for the target material can be replaced by the old material of the second type includes the following situations 2.1 and 2.2. In situation 2.1, the new material for the target material can be replaced by the old material of the second type; in situation 2.2, the new material for the target material cannot be replaced by the old material of the second type. In different situations, the actions performed by the product production planning device are different, which are described below.

In situation 2.1, the new material for the target material can be replaced by the old material of the second type.

In situation 2.1, the product production planning device executes S305.

In S305, the product production planning device determines that the target materials include the old materials of the second type and new materials of the third type.

That is to say, in a case where the new material for the target material can be replaced by the old material of the second type, the product production planning device determines that the material types of the target materials includes the second type of old materials and the third type of new materials.

For example, the new material for the material of the product PRO-2 in the second row in Table 2 can be replaced by the old material of the second type, and the product production planning device determines that the material types of the materials in the row includes the second type of old materials and the third type of new materials.

In combination with the materials of the products PRO-2 in the second row in Table 2, the product production planning device divides the materials in the row into two types of materials as shown in Table 7 (the old materials of the second type) and Table 8 (the new materials of the third type) below.

TABLE 7

| Product number | Old material | Unit consumption | Product constraint | Old material constraint | Product weight w |
|---|---|---|---|---|---|
| PRO-2 | normalmat-1 | 1 | 12000 | 5000 | 1.3 |

TABLE 8

| Product number | Conventional material number | Unit consumption | Product constraint | Material constraint | Product weight w |
|---|---|---|---|---|---|
| PRO-2 | mat-4 | 1 | 12000 | 4000 | 1.3 |

Optionally, the product production planning device divides materials of a first type into the old materials of the second type and the new materials of the third type, and combines them with other materials to obtain different sub-products.

In the above method, the product production planning device determines that the material types of the materials in which the new material can be replaced by the old material of the second type includes the second type of old materials and the third type of new materials, so as to facilitate the product production planning device to allocate materials for products according to the second type of old materials and the third type of new materials in the production planning process.

In situation 2.2, the new material for the target material cannot be replaced by the old material of the second type.

In situation 2.2, the product production planning device executes S306.

In S306, the product production planning device determines that the target materials are the new materials of the second type.

That is to say, in a case where the new material for the target material cannot be replaced by the old material of the second type, the product production planning device determines that the target materials are the new materials of the second type.

For example, the new material for the material of the product PRO-1 in the second row in Table 1 cannot be replaced by the old material of the second type, and the product production planning device determines that the material is the new material of the second type.

For the materials of the products PRO-1 in the second row in Table 1, the product production planning device determines that the materials in the row are as shown in Table 9 (the new materials of the second type).

TABLE 9

| Product number | Conventional material number | Unit consumption | Product constraint | Material constraint | Product weight w |
|---|---|---|---|---|---|
| PRO-1 | mat-2 | 2 | 12000 | 2000 | 1.5 |

In the above method, the product production planning device determines that the material type of the materials in which the new material cannot be replaced by the old material of the second type is the second type of new materials, so as to facilitate the product production planning device to allocate materials for products according to the second type of new materials in the production planning process.

The above scheme brings at least the following beneficial effects. The product production planning device divides the materials into multiple different types of materials according to whether new materials in the materials can be replaced by the old materials of the first type and new material in the materials can be replaced by the old materials of the second type, so as to facilitate the product production planning device to determine the production plan according to the material type.

Hereinafter, the linear programming model involved in the embodiments of the present disclosure will be described in detail.

The linear programming model in the embodiments of the present disclosure may be a linear programming model determined according to the current production demand and material supply situation. Optionally, the linear programming model is used to ensure that the old materials of the first type are used preferentially in the production process and the product output reaches the maximum in a case where the product material consumption is not greater than the material supply.

In an example, the linear programming model in the embodiments of the present disclosure may be a mixed-integer linear programming model.

In a possible implementation, the linear programming model includes constraint condition(s) and an objective function. The linear programming model will be described below in detail in combination with the constraint condition and the objective function.

1. Constraint Condition

In a possible implementation, the constraint condition(s) in the embodiments of the present disclosure include at least one of the following: constraint condition a (a first constraint condition on the product production output of first sub-products); constraint condition b (a second constraint condition on the material consumption of the first sub-products); constraint condition c (a third constraint condition on the product output of second sub-products); and constraint condition d (a fourth constraint condition on the material consumption of the second sub-products).

The constraint condition a and constraint condition b are used to constrain the first-stage production plan; and the constraint condition c and constraint condition d are used to constrain the second-stage production plan.

Hereinafter, the constraint condition a, constraint condition b, constraint condition c, and constraint condition d will be described in detail.

1.1. Constraint Condition a

The first constraint condition in the constraint condition a is the production demand quantity of products. That is to say, the constraint condition a is used to constrain the product production output of the first sub-products to be less than or equal to the production demand quantity of the products.

In this way, according to the constraint condition a, it is possible to avoid that the output of the first sub-products exceeds the production demand quantity of the products.

For example, in the constraint condition a, the first constraint condition on the product production output of the first sub-products satisfies the following formula 1:

$$0 \leq \sum_{m=1}^{k_1} x_m \leq p_{lmax} \qquad \text{Formula 1}$$

where $p_{lmax}$ represents the product demand quantity of the l-th type of products in the products to be produced, $k_1$ represents the number of types of first sub-products corresponding to the l-th type of products, m is the m-th type of first sub-products corresponding to the l-th type of products, and $x_m$ is the output of the m-th type of first sub-products; m is less than or equal to $k_1$ ($m \leq k_1$), and m and $k_1$ are positive integers.

1.2. Constraint Condition b

The second constraint condition in the constraint condition b is the material supply. That is to say, the constraint condition b is used to constrain the material consumption of the first sub-products to be less than or equal to the material supply.

In this way, according to the constraint condition b, it is possible to prevent the material consumption of the first sub-products from exceeding the material supply, thereby avoiding the shortage of materials in the production process.

For example, in the constraint condition b, the second constraint condition on the material consumption of the first sub-products satisfies the following formula 2:

$$0 \leq \sum_{m=1}^{n_1} a_{mq} * x_m \leq m_{qmax} \qquad \text{Formula 2}$$

where $n_1$ is used to represent the number of types of the first sub-products; $a_{mq}$ represents the quantity of the q-th type of materials consumed by the m-th type of first sub-products, and $m_{qmax}$ is the supply of the q-th type of materials; and q is a positive integer.

1.3. Constraint Condition c

The third constraint condition in the constraint condition c is a difference between the production demand quantity of the products and the output of the first sub-products. That is to say, the constraint condition c is used to constrain the output of the second sub-products to be less than the difference between the production demand quantity of the products and the output of the first sub-products.

In this way, according to constraint condition c, it is possible to prevent a sum of the output of the first sub-products and the output of the second sub-products from exceeding the production demand quantity of the products.

For example, in the constraint condition c, the third constraint condition on the product output of the second sub-products satisfies the following formula 3:

$$0 \leq \sum_{t=1}^{k_2} x_t \leq p_{lmax} - r_l \qquad \text{Formula 3}$$

where $k_2$ represents the number of types of second sub-products corresponding to the l-th type of products, t is the t-th type of second sub-products corresponding to the l-th type of products, $x_t$ is the output of the t-th type of second sub-products, and n is the output of the first sub-products corresponding to the l-th type of products to be produced in the first-stage production plan.

1.4. Constraint Condition d

The fourth constraint condition in the constraint condition d is that the material consumption of the second subproducts is less than or equal to the difference between the material supply and the material consumption of the first sub-products.

In this way, according to the constraint condition d, it is possible to prevent a sum of the material consumption of the first sub-products and the material consumption of the second sub-products from exceeding the material supply, thereby avoiding the shortage of materials in the production process.

For example, in the constraint condition d, the fourth constraint condition on the material consumption of the second sub-products satisfies the formula 4:

$$0 \leq \sum_{k=1}^{n_2} a_{tq} * x_t \leq m_{qmax} - s_q \qquad \text{Formula 4}$$

where $n_2$ is used to represent the number of types of the second sub-products, $a_{tq}$ is used to represent the quantity of the q-th type of materials consumed by the t-th type of second sub-products, and $s_q$ is the consumption of the q-th type of materials required to produce the first sub-products in the first-stage production plan.

In the above, the constraint conditions in the embodiments of the present disclosure are described in detail. Based on the above constraint conditions, it is possible to ensure that the production output of products in each stage of the production plan is less than or equal to the demand quantity of the products, and the material consumption of the products is less than or equal to the material supply.

2. Objective Function

In a possible implementation, the objective function in the embodiments of the present disclosure is an objective function that maximizes the product output of the first sub-products and maximizes the product output of the second sub-products. For example, the objective function satisfies the formula 5:

$$obj = \max \sum_{i=1}^{n_1} w_i * x_i + \max \sum_{j=1}^{n_2} w_j * x_j \qquad \text{Formula 5}$$

where obj is the output of products to be produced, and $n_1$ is used to represent the number of types of first sub-products; i represents the i-th type of first sub-products, $x_i$ is the output of the i-th type of first sub-products, and $w_i$ is the weight value of the i-th type of first sub-products; $n_2$ is used to represent the number of types of second sub-products; j represents the j-th type of second sub-products; $w_j$ is the weight value of the j-th type of second sub-products, and $x_j$ is the output of the j-th type of second sub-products; i is less than or equal to $n_1$ (i≤$n_1$), j is less than or equal to $n_2$ (j≤$n_2$); i and j are positive integers.

In the above, the objective function in the embodiments of the present disclosure is described in detail. Based on the objective function, it is possible to ensure that the product output of the first sub-products is maximized and the product output of the second sub-products is maximized.

It will be pointed out that the objective function and preset constraint conditions are only exemplary descriptions. In the specific implementation process, the objective function and preset constraint conditions may also be expressed in other ways, which are not limited in the embodiments of the present disclosure.

In the specific application process, the mixed-integer linear programming model may be used to determine the objective function and constraint conditions in the embodiments of the present disclosure. All or some of the constraint conditions of the model are specified as integers, and the solution result is an integer.

As an example, in the embodiments of the present disclosure, a branch and bound method may be used to improve the original mixed-integer linear programming problem into a row relaxation problem, and a simplex method may be used to continuously solve the problem. In the specific solution process, the branch solution is carried out by adding constraints, and the optimal solution of the integer is guided to appear at a vertex of the new improved relaxation problem.

As another example, in the embodiments of the present disclosure, a cutting plane method may also be used to change the original mixed-integer linear programming problem into a restricted relaxation problem, and a simplex method may be used to solve the problem. In the process of solving the problem, Gomott cutting is generated and added through a simple form table of linear relaxation, constraint condition space is cut, and the optimal solution of the linear relaxation is guided to be an integer.

It will be pointed out that S202 may be regarded as finding the optimal solution according to the preset constraint conditions and objective function. The optimal solution may be obtained by inputting the problem data into an optimization problem solver and setting the preset constraint conditions and objective function. The solver currently used includes: solving constraint integer programs (SCIP), GUROBI, GNU linear programming kit (GLPK), CPLEX, or the like. For example, the GLPK solver is used in the embodiments of the present disclosure.

It will be pointed out that, the above is only an exemplary description for the constraint conditions and the objective function. In specific implementation, the constraint conditions and the objective function may also be realized in other ways, which is not limited in the present disclosure.

The above scheme brings at least the following beneficial effects. The product production planning device establishes an objective function in which the output of the first sub-products is maximized and the output of the second sub-products is maximized, and simultaneously constrains the output of the products to be less than or equal to the product demand quantity, and the material consumption of the products is less than or equal to the material supply. In this way, in the first-stage production plan, the first sub-products will consume a large quantity of the old materials of the first-type, which realizes the purpose of preferentially allocating the materials. Moreover, the objective function can ensure that the output of the second sub-products is also maximized in a case where the output of the first sub-products is maximized, so that the output of the products to be produced in the embodiments of the present disclosure is maximized, and the production efficiency of the products is improved.

In addition, due to the complex materials used in LCD products in the related art, there is a situation where multiple products share one or more types of materials, and the method of manually planning materials is cumbersome and error-prone. By using the product production planning method provided in the embodiments of the present disclosure, the material allocation of the products can be automatically completed according to the objective function and constraint conditions, which solves the cumbersome and error-prone problem of manually planning materials in the related art.

Hereinafter, the process of determining the production plan of the products to be produced by the product production planning device according to the linear programming model and the material types in S202 will be described in detail.

Figure 4:
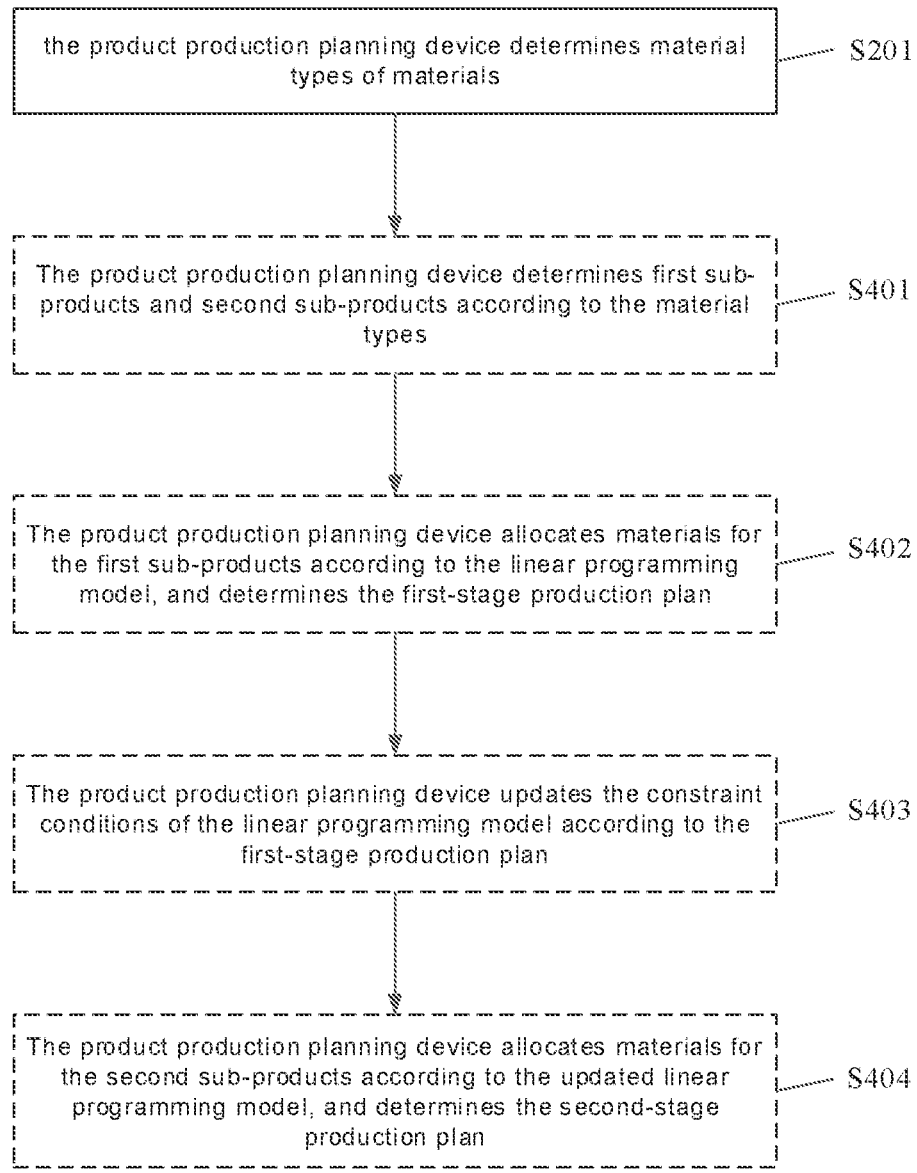
FIG. 4 is a flow diagram of yet another product production planning method, in accordance with embodiments of the present disclosure.

In combination with FIG. 2, as shown in FIG. 4, S202 may be implemented through S401 to S404.

In S401, the product production planning device determines first sub-products and second sub-products according to the material types.

The first sub-products are products planned to be produced in the first-stage production plan, and the second sub-products are products planned to be produced in the second-stage production plan.

In an implementation, the product production planning device performs a material formula combination according to materials, the material types of which are the first type of old materials, the second type of new materials, the second type of old materials and the third type of new materials, and determines the first sub-products.

The product production planning device performs a material formula combination according to materials, the material types of which are the first type of new materials, the second type of new materials, the second type of old materials and the third type of new materials, and determines the second sub-products.

In S402, the product production planning device allocates materials for the first sub-products according to the linear programming model, and determines the first-stage production plan.

In a possible implementation, this process may be implemented as follows. The product production planning device allocates the materials for the first sub-products according to the constraint condition a, constraint condition b, and the objective function in the linear programming model, and determines the first-stage production plan.

It will be pointed out that the first-stage production plan further includes the output of each type of first sub-products and the consumption of each type of materials.

Based on the output of each type of first sub-products, the product production planning device may determine the output of each type of products to be produced in the first-stage production plan.

For example, first sub-products in a type of products to be produced includes first sub-products A and first sub-products B. The product production planning device determines that the output of the type of products to be produced in the first-stage production plan is a sum of the output of the first sub-products A and the output of the first sub-products B.

In S403, the product production planning device updates the constraint conditions of the linear programming model according to the first-stage production plan.

In a possible implementation, the product production planning device updates the constraint condition a and determines the constraint condition c according to the output of each type of first sub-products in the first-stage production plan.

The product production planning device updates the constraint condition b and determines the constraint condition d according to the consumption of each type of materials in the first-stage production plan.

In S404, the product production planning device allocates materials for the second sub-products according to the updated linear programming model, and determines the second-stage production plan.

In a possible implementation, this process may be implemented as follows. The product production planning device allocates the materials for the second sub-products according to the updated constraint condition c and constraint condition d, and the objective function, and determines the second-stage production plan.

The above scheme provides the specific process where the product production planning device determines the first-stage production plan and the second-stage production plan according to the linear programming model and the material types. The product production planning device first determines the first-stage production plan according to the constraint conditions and the objective function, and then updates the constraint conditions in the second-stage production plan according to the first-stage production plan, which ensures that in each stage production plan, the product constraint is less than or equal to the product demand quantity, and the material constraint is less than or equal to the material supply.

Hereinafter, the process of determining the first sub-products and the second sub-products by the product production planning device in S401 will be described in detail.

Figure 5:
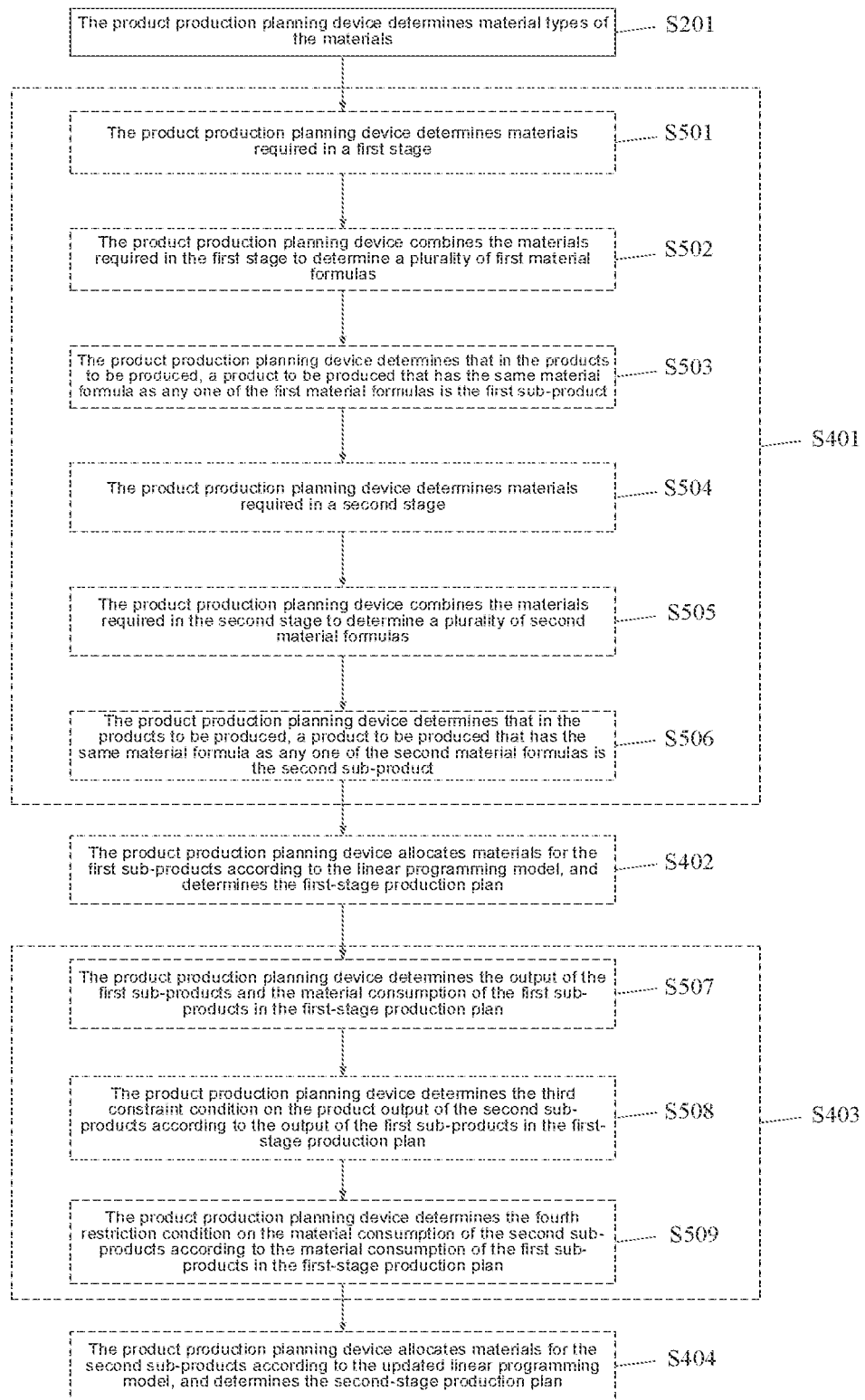
FIG. 5 is a flow diagram of yet another product production planning method, in accordance with embodiments of the present disclosure.

In combination with FIG. 4, as shown in FIG. 5, the process of determining the first sub-products by the product production planning device in S401 may be implemented through S501 to S503.

In S501, the product production planning device determines materials required in a first stage.

The materials required in the first stage include at least one of the following: the old materials of the first type, the new materials of the second type, and the target materials.

For example, the product production planning device determines that the material tables, used to be allocated to the first sub-products in the first stage, in Table 3 to Table 9 include: Table 3, Table 5, Table 7, Table 8 and Table 9.

In S502, the product production planning device combines the materials required in the first stage to determine a plurality of first material formulas.

Table 3 is used to combine with Table 9 to obtain first sub-products of products PRO-1. Table 5 is used to combine with Table 7 and Table 8 respectively, so as to obtain first sub-products of products PRO-2.

The product production planning device combines Table 3 with Table 9 to obtain Table 10, which is used to represent the material demand of the first sub-products VPRO-1 of the products PRO-1.

TABLE 10

| Product number | Sub-product number | Material | Unit consumption | Product constraint | Material constraint | Product weight w |
|---|---|---|---|---|---|---|
| PRO-1 | VPRO-1 | oldmat-1 | 1 | 12000 | 8000 | 1.5 |
| PRO-1 | VPRO-1 | mat-2 | 2 | 12000 | 2000 | 1.5 |

That is to say, the first sub-products VPRO-1 of the products PRO-1 are sub-products produced by using materials oldmat-1 and mat-2.

The product production planning device combines Table 5 with Table 7 to obtain Table 11, which is used to represent the material demand of first sub-products VPRO-2 of the products PRO-2.

TABLE 11

| Product number | Sub-product number | Material | Unit consumption | Product constraint | Material constraint | Product weight w |
|---|---|---|---|---|---|---|
| PRO-2 | VPRO-2 | oldmat-2 | 1 | 12000 | 5000 | 1.3 |
| PRO-2 | VPRO-2 | normalmat-1 | 1 | 12000 | 5000 | 1.3 |

That is to say, the first sub-products VPRO-2 of the products PRO-2 are sub-products produced by using materials oldmat-2 and normalmat-1.

The product production planning device combines Table 5 with Table 8 to obtain Table 12, which is used to represent the material demand of first sub-products VPRO-3 of the products PRO-2.

TABLE 12

| Product number | Sub-product number | Material | Unit consumption | Product constraint | Material constraint | Product weight w |
|---|---|---|---|---|---|---|
| PRO-2 | VPRO-3 | oldmat-2 | 1 | 12000 | 5000 | 1.3 |
| PRO-2 | VPRO-3 | mat-4 | 1 | 12000 | 4000 | 1.3 |

That is to say, the first sub-products VPRO-3 of the products PRO-2 are sub-products produced by using materials oldmat-2 and mat-4.

In S503, the product production planning device determines that in the products to be produced, a product to be produced that has the same material formula as any one of the first material formulas is the first sub-product.

For example, the product production planning device determines that the product to be produced that has the same material formula as the material formula shown in any one of Table 10, Table 11, and Table 12 is the first sub-product.

It will be noted that the product production planning device may also determine the first sub-product through a method other than S501 to S503, which is not limited in the present disclosure.

In a possible implementation, the product production planning device determines the material formula of each sub-product of products to be produced; after that, the product production planning device determines a material formula that can be obtained from the combination of one or more types of materials in the old material of the first type, the new material of the second type, and the material of the first type in the material formulas of the sub-products. The product production planning device determines that the sub-product corresponding to the combined material formula is the first sub-product.

In another possible implementation, the product production planning device determines that a sub-product that meets any of the following conditions is the first sub-product: a sub-product consisting of the old material of the first type; a sub-product consisting of the new material of the second type; a sub-product consisting of the new material of the third type; a sub-product consisting of the old material of the first type and the new material of the second type; a sub-product consisting of the old material of the first type and the material of the first type; a sub-product consisting of the new material of the second type and the material of the first type; a sub-product consisting of the old material of the first type, the new material of the second type and the material of the first type.

In S501 to S503, the product production planning device determines the first sub-product by combining the old material of the first type, the new material of the second type, and the target material. In this way, the product production planning device may determine the first-stage production plan according to the material formula of the first sub-product and the linear programming model.

As shown in FIG. 5, the process of determining the second sub-products by the product production planning device in S401 may be implemented through S504 to S506.

In S504, the product production planning device determines materials required in a second stage.

The materials required in the second stage include the new materials of the first type; or the materials required in the second stage includes the new materials of the first type and at least one of the new materials of the second type and the target materials.

For example, the product production planning device determines that the material tables, used to be allocated to the second sub-products in the second stage, in Table 3 to Table 9 include: Table 4, Table 6, Table 7. Table 8 and Table 9.

In S505, the product production planning device combines the materials required in the second stage to determine a plurality of second material formulas.

Table 4 is used to combine with Table 9 to obtain second sub-products of the products PRO-1. Table 6 is used to combine with Table 7 and Table 8 respectively, so as to obtain second sub-products of the products PRO-2.

The product production planning device combines Table 4 with Table 9 to obtain Table 13, which is used to represent the material demand of the second sub-products VPRO-4 of the products PRO-1.

TABLE 13

| Product number | Sub-product number | Material | Unit consumption | Product constraint | Material constraint | Product weight w |
|---|---|---|---|---|---|---|
| PRO-1 | VPRO-4 | mat-1 | 1 | 12000-Z | 3000 | 1.5 |
| PRO-1 | VPRO-4 | mat-2 | 2 | 12000-Z | 2000-Y | 1.5 |

Y represents the consumption of the materials in the first-stage production plan.

That is to say, the second sub-products VPRO-4 of the products PRO-1 are sub-products produced by using materials mat-1 and mat-2.

The product production planning device combines Table 6 with Table 7 to obtain Table 14, which is used to represent the material demand of second sub-products VPRO-5 of the products PRO-2.

TABLE 14

| Product number | Sub-product number | Material | Unit consumption | Product constraint | Material constraint | Product weight w |
|---|---|---|---|---|---|---|
| PRO-2 | VPRO-5 | mat-3 | 1 | 12000-Z | 3000 | 1.3 |
| PRO-2 | VPRO-5 | normalmat-1 | 1 | 12000-Z | 5000-Y | 1.3 |

That is to say, the second sub-products VPRO-5 of the products PRO-2 are sub-products produced by using materials mat-3 and normalmat-1.

The product production planning device combines Table 6 with Table 8 to obtain Table 15, which is used to represent the material demand of second sub-products VPRO-6 of the products PRO-2.

TABLE 15

| Product number | Sub-product number | Material | Unit consumption | Product constraint | Material constraint | Product weight w |
|---|---|---|---|---|---|---|
| PRO-2 | VPRO-6 | mat-3 | 1 | 12000-Z | 3000 | 1.3 |
| PRO-2 | VPRO-6 | mat-4 | 1 | 12000-Z | 4000-Y | 1.3 |

That is to say, the second sub-products VPRO-6 of the products PRO-2 are sub-products produced by using materials mat-3 and mat-4.

In S506, the product production planning device determines that in the products to be produced, a product to be produced that has the same material formula as any one of the second material formulas is the second sub-product.

For example, the product production planning device determines that the product to be produced that has the same material formula as the material formula shown in any one of Table 13, Table 14, and Table 15 is the second sub-product.

It will be pointed out that the product production planning device may also determine the second sub-product through a method other than S501 to S503, which is not limited in the present disclosure.

In a possible implementation, the product production planning device determines the material formula of each sub-product of products to be produced; after that, the product production planning device determines a material formula that can be composed of the new material of the first type in the material formulas of the sub-products, or determines a material formula that can be composed of the new material of the first type and at least one of the new material of the second type and the material of the first type in the material formulas of the sub-products. The product production planning device determines that the sub-product corresponding to the material formula formed in this process is the second sub-product.

In another possible implementation, the product production planning device determines that a sub-product that meets any of the following conditions is the second sub-product: a sub-product consisting of the new material of the first type; a sub-product consisting of the new material of the first type and the new material of the second type; a sub-product consisting of the new material of the first type and the material of the first type; and a sub-product consisting of the new material of the first type, the new material of the second type and the material of the first type.

In yet another possible implementation, the product production planning device determines that a material formula except the material formula of the first sub-product in the material formulas of the sub-products is the material formula of the second sub-product.

In S504 to S506, the product production planning device determines the second sub-product by combining the new material of the first type or at least one of the new material of the second type and the target material in the second stage with the old material of the first type. In this way, the product production planning device may determine the second-stage production plan according to the material formula of the second sub-product and the linear programming model.

In the following, the process of updating the constraint conditions of the linear programming model by the product production planning device according to the first-stage production plan will be described in detail in combination with S403.

As shown in FIG. 5, S403 may be implemented through S507 to S509.

In S507, the product production planning device determines the output of the first sub-products and the material consumption of the first sub-products in the first-stage production plan.

In a possible implementation, before S507, the product production planning device needs to first determine the first constraint condition in the constraint condition a, and the second constraint condition in the constraint condition b.

In combination with Table 1 and Table 2, the first product constraint is shown in Table 16, and the first material constraint is shown in Table 17.

TABLE 16

| Product | First constraint condition |
| --- | --- |
| PRO1 | 12000 |
| PRO2 | 12000 |

TABLE 17

| Material Number | Second constraint condition |
| --- | --- |
| mat1 | 3000 |
| mat2 | 2000 |
| mat3 | 3000 |
| mat4 | 4000 |
| oldmat-1 | 8000 |
| oldmat-2 | 5000 |
| normalmat-1 | 5000 |

After that, the product production planning device determines that the output of the first sub-products in the first-stage production plan is shown in Table 18, and the material consumption of the first sub-products is shown in Table 19.

TABLE 18

| Product | Output of first sub-products |
| --- | --- |
| PRO1 | 300 |
| PRO2 | 300 |

TABLE 19

| Material Number | Material consumption of first sub-products |
| --- | --- |
| mat1 | 0 |
| mat2 | 600 |
| mat3 | 0 |
| mat4 | 150 |
| oldmat-1 | 300 |
| oldmat-2 | 300 |
| normalmat-1 | 150 |

In S508, the product production planning device determines the third constraint condition on the product output of the second sub-products according to the output of the first sub-products in the first-stage production plan.

In a possible implementation, the product production planning device subtracts the output of the first sub-products in the first-stage production plan from the production demand quantity of the products in the first constraint condition to obtain the production demand quantity of the products in the third constraint condition.

As an example, the product production planning device associates Table 16 with Table 18, and subtracts the product output in the first stage in Table 18 from the first constraint condition in Table 16 to obtain the third constraint condition. The third constraint condition is shown in Table 20.

TABLE 20

| Product | Third constraint condition |
| --- | --- |
| PRO1 | 11700 |
| PRO2 | 11700 |

In S509, the product production planning device determines the fourth restriction condition on the material consumption of the second sub-products according to the material consumption of the first sub-products in the first-stage production plan.

In a possible implementation, the product production planning device subtracts the material consumption of the first sub-products in the first-stage production plan from the material supply in the second constraint condition to obtain the material supply in the fourth constraint condition.

As an example, the product production planning device associates Table 17 with Table 19, and subtracts the material consumption of the first sub-products in Table 19 from the second constraint condition in Table 17 to obtain the fourth constraint condition. The fourth constraint condition is as shown in Table 21.

TABLE 21

| Material Number | Second material constraint |
| --- | --- |
| mat1 | 3000 |
| mat2 | 1400 |
| mat3 | 3000 |
| mat4 | 3850 |
| oldmat-1 | 7700 |
| oldmat-2 | 4700 |
| normalmat-1 | 4850 |

The above scheme brings at least the following beneficial effects. The product production planning device subtracts the output of the first sub-products in the first-stage production plan from the initial product production demand quantity to obtain the third constraint condition used for constraining the product output in the second-stage production plan. The product production planning device subtracts the quantity of materials consumed in the first-stage production plan from the initial material supply to obtain the fourth constraint condition used for constraining the material consumption in the second-stage production plan. Based on this, the product production planning device can make the total quantity of products produced in each stage less than the initial product demand quantity, and the total quantity of materials consumed in each stage is less than the initial material supply.

It can be seen that the above mainly introduces the technical solutions provided in the embodiments of the present disclosure from the perspective of methods. In order to realize the above functions, hardware structures and/or software modules for performing corresponding functions are included. Those skilled in the art should easily realize that, in combination with the exemplary modules and algorithm steps described in the embodiments disclosed herein, the embodiments of the present disclosure can be implemented in the form of hardware or a combination of hardware and computer software. Whether a certain function is executed by hardware or by computer software driving hardware depends on the specific application and design constraint conditions of the technical solution. Professionals may use different methods to implement the described functions for each specific application, but such implementation should not be regarded as exceeding the scope of the present disclosure.

The embodiments of the present disclosure may divide the functional modules or functional units of the product production planning device according to the above method example. For example, each functional module or functional unit may be divided corresponding to each function, or two or more functions may be integrated into one processing module. The integrated module may be implemented in the form of hardware, or in the form of the software function module or functional unit. The division of modules or units in the embodiments of the present disclosure is schematic, and is only a logical function division, and there may be another division manner in actual implementation.

Figure 6:
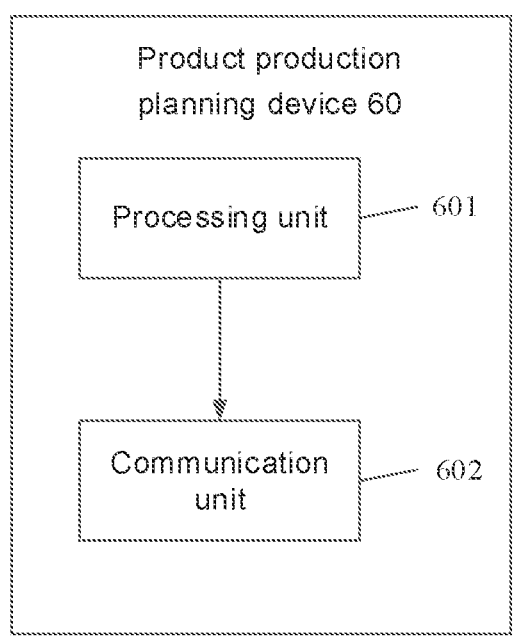
FIG. 6 is a schematic diagram showing a structure of a product production planning device, in accordance with embodiments of the present disclosure.

FIG. 6 is a schematic structure diagram of a product production planning device 60 provided in embodiments of the present disclosure, and the device includes a processing unit 601.

The processing unit 601 is configured to determine material types of materials. The material types include a first type of old materials and a first type of new materials. The processing unit 601 is further configured to determine a production plan of products to be produced according to a linear programming model and the material types. The production plan includes a first-stage production plan and a second-stage production plan, the first-stage production plan is a production plan for producing products to be produced based on the old materials of the first type, and the second-stage production plan is a production plan for producing products to be produced based on the new materials of the first type.

In a possible implementation, the old materials of the first type are unconventional old materials, and substitute materials of the new materials of the first type are the old materials of the first type.

In a possible implementation, the material types further include a second type of new materials and a first type of materials. The new materials of the second type are new materials for which there is no substitute material. The materials of the first type include conventional old materials and materials whose substitute materials are conventional old materials.

In a possible implementation, determining the material types of the materials includes: determining whether there is a substitute material for the material, the substitute material including any one of the old material of the first type and the conventional old material; dividing the materials into the old materials of the first type and the new materials of the first type in a case where a new material for the material can be replaced by the old material of the first type; determining that the materials include the old materials of the second type and the new materials of the third type in a case where there is a substitute material of the conventional old material for the material; and determining that the materials include new materials of the second type in a case where there is no substitute material for the material.

In a possible implementation, the linear programming model includes constraint conditions and an objective function. The constraint conditions are used to constrain the output of the products to be produced to be less than the product demand quantity, and the material consumption of the products to be produced to be less than the material supply. The objective function is used to determine the maximum output of the products to be produced in a case where the first constraint condition is met.

In a possible implementation, the constraint conditions include a first constraint condition and a second constraint condition. The first constraint condition is used to constrain the output of the first sub-products to be less than the product demand quantity, and the material consumption of the first sub-products to be less than the material supply. The first sub-products are the products to be produced in the first-stage production plan. The second constraint condition is used to constrain the output of the second sub-products to be less than a first difference, and the material consumption of the second sub-products to be less than a second difference. The first difference is a difference between the product demand quantity and the output of the first sub-products. The second difference is a difference between the material supply and the quantity of the materials consumed by the first sub-products. The second sub-products are the product to be produced in the second-stage production plan.

In a possible implementation, the processing unit 601 is configured to determine the first sub-products according to the materials required in the first stage. The materials required in the first stage include at least one type of the following: the old materials of the first type, the new materials of the second type, and materials of the first type. The processing unit 601 is further configured to determine the second sub-products according to the materials required in the second stage. The materials required in the second stage include the new materials of the first type; or the materials required in the second stage include the new materials of the first type and at least one of the new materials of the second type and the materials of the first type.

In a possible implementation, the processing unit 601 is configured to: determine the materials required in the first stage; combine the materials required in the first stage to determine a plurality of first material formulas; and determine a product to be produced that has the same material formula as any one of the first material formulas in the products to be produced as the first sub-product.

In a possible implementation, the processing unit 601 is configured to: determine the materials required in the second stage; combine the materials required in the second stage to determine a plurality of second material formulas; and determine a product to be produced that has the same material formula as any one of the second material formulas in the products to be produced as the second sub-product.

In a possible implementation, the processing unit 601 is configured to: allocate materials for the first sub-products according to the first constraint condition and the objective function, and determine the first-stage production plan; determine the second constraint condition according to the output of the first sub-products and the material consumption of the first sub-products in the first-stage production plan; and allocate materials for the second sub-products according to the second constraint condition and the objective function, and determine the second-stage production plan.

In a possible implementation, the processing unit 601 is configured to: determine a plurality of first production plans, each first production plan including the output and the material consumption of the first sub-products, and each first production plan satisfying the first constraint condition; and determine a first production plan with the largest output of the first sub-products in the plurality of first production plans as the first-stage production plan.

In a possible implementation, the output of the first sub-products is a weighted sum of the output of each type of first sub-products.

In a possible implementation, the processing unit 601 is configured to: determine a plurality of second production plans, each second production plan including the output and material consumption of the second sub-products, and each second production plan satisfying the second constraint condition; and determine a second production plan with the largest output of the second sub-products in the plurality of second production plans as the second-stage production plan.

In a possible implementation, the output of the second sub-products is a weighted sum of the output of each type of second sub-products.

In a possible implementation, the products to be produced includes $n_1$ types of first sub-products and $n_2$ types of second sub-products, where $n_1$ and $n_2$ are positive integers. The objective function satisfies the following formula:

$$obj = \max \sum_{i=1}^{n_1} w_i * x_i + \max \sum_{j=1}^{n_2} w_j * x_j$$

where obj is the output of the products to be produced, i represents the i-th type of first sub-products, $x_i$ is the output of the i-th type of first sub-products, and $w_i$ is the weight value of the i-th type of first sub-products; j represents the j-th type of second sub-products; $w_j$ is the weight value of the j-th type of second sub-products, and $x_j$ is the output of the j-th type of second sub-products; i is less than or equal to $n_1$ ($i \leq n_1$), j is less than or equal to $n_2$ ($j \leq n_2$); i and j are positive integers.

In a possible implementation manner, the constraint conditions include a product constraint condition and a material constraint condition.

The product constraint condition satisfies the following formula:

$$0 \leq \sum_{m=1}^{k} x_m \leq p_{lmax}$$

where $p_{lmax}$ represents the product demand quantity of the m-th type of products in the products to be produced, and k represents the number of types of sub-products corresponding to the m-th type of products; m is less than or equal to k, and m and k are positive integers.

The material constraint condition satisfies the following formula:

$$0 \leq \sum_{l=1}^{n} a_{iq} * x_l \leq m_{qmax}$$

where $a_{lq}$ represents the quantity of the q-th type of materials consumed by the l-th type of sub-products, and $m_{qmax}$ is the supply of the q-th type of material; l and q are positive integers.

Optionally, as shown in FIG. 6, the product production planning device 60 further includes a communication unit 602 used to communicate with other devices.

When implemented by hardware, the communication unit 602 in the embodiments of the present disclosure may be integrated in a communication interface, and the processing unit 601 may be integrated in a processor. The specific implementation manner is shown in FIG. 1.

Figure 7:
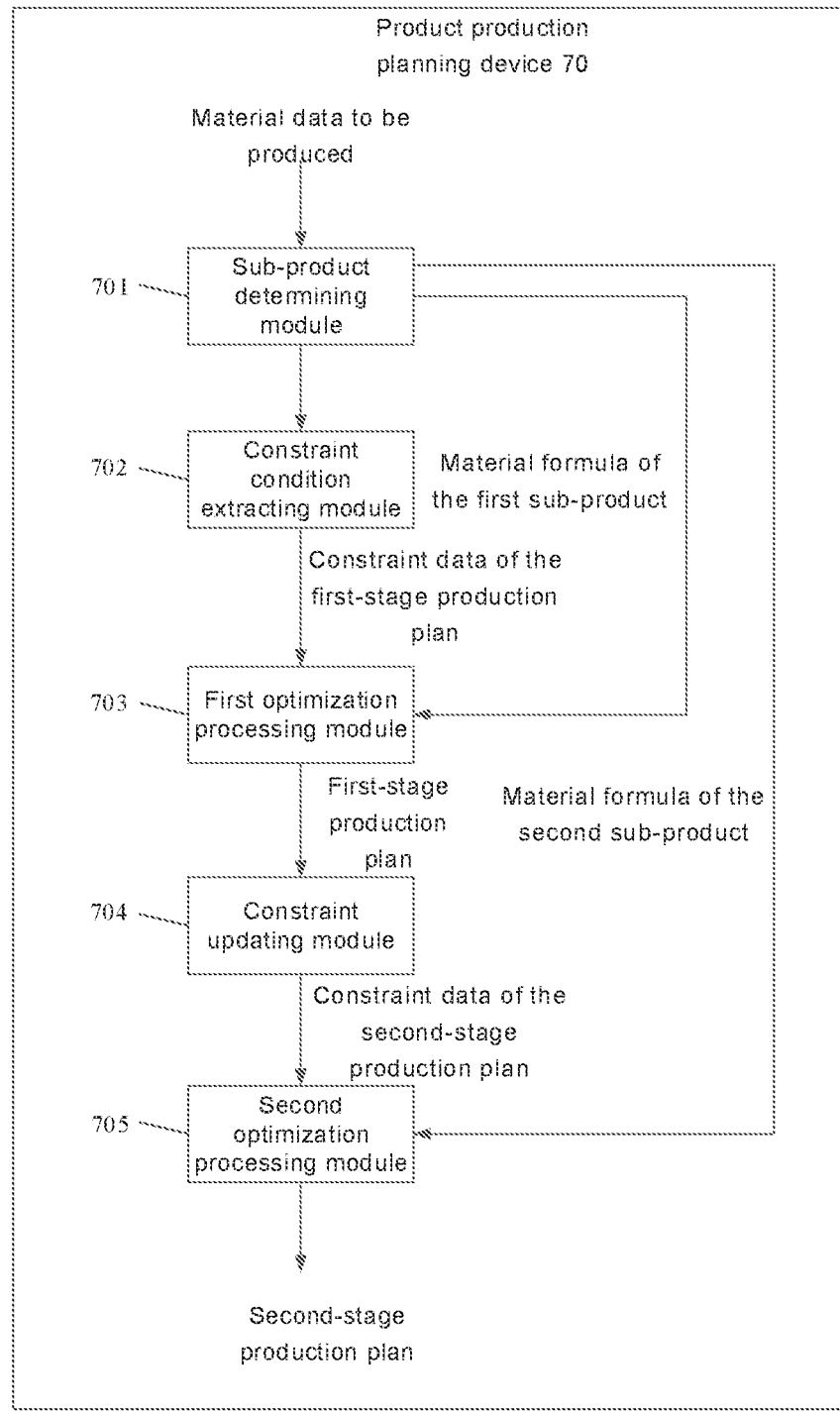
FIG. 7 is a schematic diagram showing a structure of another product production planning device, in accordance with embodiments of the present disclosure.

FIG. 7 is another schematic structure diagram of a product production planning device 70 provided in embodiments of the present disclosure. As shown in FIG. 7, the product production planning device 70 includes: a sub-product determining module 701, a constraint condition extracting module 702, a first optimization processing module 703, a constraint updating module 704, and a second optimization processing module 705.

The sub-product determining module 701 is used to determine the first sub-products and the second sub-products. The sub-product determining module is used to determine the first sub-products and the second sub-products according to the input material data of products to be produced (e.g., the data shown in Table 1 and Table 2). For example, in combination with the embodiments described in the FIGS. 2 to 5, the sub-product determining module 701 may be used to execute the method described in S201 in FIG. 2 or S301 to S306 in FIG. 3 to determine the material type of each material, and execute S401 in FIG. 4 or S501 to S506 in FIG. 5 to determine the first sub-products and the second sub-products.

As an example, as shown in FIG. 7, the input data of the sub-product determination module 701 is the material data of the products to be produced. The output data of the sub-product determining module 701 includes the material formula of the first sub-product and the material formula of the second sub-product.

The constraint condition extracting module 702 is used to determine the constraint data of the first-stage production plan in the linear programming model (which may also be used to determine the first constraint condition in the constraint conditions).

As an example, as shown in FIG. 7, the constraint condition extracting module 702 is used to extract product constraint data and material constraint data from the material data of the products to be produced to determine the constraint conditions.

The first optimization processing module 703 is used to determine the first-stage production plan, e.g., perform S402 in FIG. 4.

The objective function and constraint conditions are configured in the first optimization processing module 703. The input data of the first optimization processing module 703 includes the material formula of the first sub-product and the constraint data extracted by the constraint condition extracting module 702.

As an example, as shown in FIG. 7, the first optimization processing module 703 determines the constraint conditions according to the constraint data extracted by the constraint condition extracting module 702, and determines the first-stage production plan according to the material formula of the first sub-product, the objective function, and the constraint conditions.

The constraint updating module 704 is used to update the constraint condition according to the output and material consumption of the first sub-products in the first-stage production plan, and determine the second constraint condition. For example, the constraint updating module 704 is used to execute S403 in FIG. 4 or S507 to S509 in FIG. 5.

As an example, as shown in FIG. 7, the input data of the constraint updating module 704 includes the first-stage production plan determined by the first optimization processing module 703 and the constraint data determined by the constraint condition extracting module 702. The output data of constraint updating module 704 includes the material constraint data and product constraint data in the second constraint condition.

The second optimization processing module 705 is used to determine the second-stage production plan, e.g., perform S404 in FIG. 4.

The objective function and constraint conditions are configured in the second optimization processing module 705. The input data of the second optimization processing module 705 includes the material formula of the second sub-product, and the material constraint data and product constraint data output by the constraint updating module 704.

As an example, as shown in FIG. 7, the second optimization processing module 705 updates the second constraint condition according to the material constraint data and product constraint data output by the constraint updating module 704, and determines the second-stage production plan according to the material formula of the second sub-product, the objective function, and the second constraint condition.

Based on the foregoing described embodiments, a person skilled in the art may clearly understand that, for the purpose of convenient and brief description, division of the foregoing functional modules is used as an example for description. In actual application, the foregoing functions may be allocated to different functional modules for implementation according to needs. That is, an inner structure of a device is divided into different functional modules to implement all or some of the functions described above. For a specific working process of the system, device and unit, reference may be made to a corresponding process in the foregoing method embodiments, and details will not be described herein again.

Some embodiments of the present disclosure provide a computer-readable storage medium (e.g., a non-transitory computer-readable storage medium). The computer readable storage medium has stored thereon computer program instructions that, when run on a computer (e.g., the product production planning device), cause the computer to perform the product production planning method as described in any one of the above embodiments.

For example, the computer-readable storage medium may include, but is not limited to: a magnetic storage device (e.g., a hard disk, a floppy disk, or a magnetic tape, etc.), an optical disk (e.g., a compact disk (CD), a digital versatile disk (DVD), etc.), a smart card or a flash memory device (e.g., an erasable programmable read-only memory (EPROM), a card, a stick or a key drive, etc.). The various computer-readable storage media described in the embodiments of the present disclosure may represent one or more devices for storing information and/or other machine-readable storage media for storing information. The term "machine-readable storage media" may include, but are not limited to, wireless channels and various other media capable of storing, containing, and/or carrying instructions and/or data.

Some embodiments of the present disclosure further provide a computer program product. For example, the computer program product is stored on a non-transitory computer-readable storage medium. The computer program product includes computer program instructions that, when executed on a computer (e.g., the product production planning device), cause the computer to perform the product production planning method as described in the above embodiments.

Some embodiments of the present disclosure further provide a computer program. When the computer program is executed on a computer (e.g., the product production planning device), the computer program causes the computer to perform the product production planning method as described in the above embodiments.

The computer-readable storage medium, the computer program product and the computer program have the same beneficial effects as the product production planning method as described in some embodiments of the present disclosure, which will be not described herein again.

In the embodiments provided in the present disclosure, it will be understood that the disclosed system, device and method may be implemented in other ways. For example, the device embodiments described above are illustrative only. For example, the division of the units is only a logical function division, and there may be another division manner in actual implementation. For example, a plurality of units or components may be combined or may be integrated into another system, or some features may be omitted, or not implemented. In another point, the mutual coupling or direct coupling or communication connection shown or discussed may be an indirect coupling or communication connection through some interfaces, devices or units, and may be in electrical, mechanical or other forms.

The units described as separate components may or may not be physically separated, and the components shown as units may or may not be physical units, i.e., may be located in one place, or may be distributed on multiple network units. Some or all of the units may be selected according to actual needs to achieve the purpose of the solution of the embodiments.

In addition, functional units in each embodiment of the present disclosure may be integrated into one processing unit, each unit may exist separately physically, or two or more units may be integrated into one unit.

Some embodiments of the present disclosure further provide a chip. The chip includes a processor and a communication interface, the communication interface is coupled to the processor, and the processor is used to run computer programs or instructions to implement the product production planning method according to any one of the above embodiments.

For example, the chip further includes a memory for storing the computer programs or instructions.

Finally, it will be noted that, the foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A product production planning method, comprising:
   determining material types of materials, the material types including a first type of old materials and a first type of new materials;
   determining a production plan of products to be produced based on the old materials of the first type and the new materials of the first type included in the materials, according to a linear programming model and the material types;
     wherein the linear programming model includes a constraint condition and an objective function;
   the production plan includes a first-stage production plan and a second-stage production plan, the first-stage production plan is a production plan for producing products to be produced according to the old materials of the first type, and the second-stage production plan is a production plan for producing products to be produced according to the new materials of the first type:
- wherein the objective function is an objective function that maximizes a product output of first sub-products and maximizes a product output of second sub-products; the first sub-products are products planned to be produced in the first-stage production plan; and the second sub-products are products planned to be produced in the second-stage production plan;
- wherein determining the production plan of the products to be produced according to the linear programming model and the material types includes:
  - determining the first sub-products and the second sub-products according to the material types;
  - allocating materials for the first sub-products according to the linear programming model to determine the first-stage production plan;
  - updating constraint conditions of the linear programming model according to the first-stage production plan; and
  - allocating materials for the second sub-products according to the updated linear programming model to determine the second-stage production plan.

2. The method according to claim 1, wherein the material types further include a second type of old materials, a second type of new materials and a third type of new materials, and determining the material types of the materials includes:
- determining whether new materials in the materials are able to be replaced by old materials;
- dividing the materials into the old materials of the first type and the new materials of the first type in a case where new materials in the materials are able to be replaced by the old materials of the first type;
- determining that the materials include the old materials of the second type and the new materials of the third type in a case where new materials in the materials are able to be replaced by the old materials of the second type; and
- determining that the materials include the new materials of the second type in a case where new materials in the materials are unable to be replaced by old materials.

3. The method according to claim 1, wherein the constraint condition includes at least one of a first constraint condition on a product production output of the first sub-products, a second constraint condition on a material consumption of the first sub-products, a third constraint condition on a product output of the second sub-products, and a fourth constraint condition on a material consumption of the second sub-products;
- wherein the first sub-products are products planned to be produced in the first-stage production plan; the second sub-products are products planned to be produced in the second-stage production plan.

4. The method according to claim 3, wherein the first constraint condition on the product production output of the first sub-products satisfies the formula:

$$0 \le \sum_{m=1}^{k_1} x_m \le p_{lmax};$$

where $p_{lmax}$ represents a product demand quantity of an l-th type of products in the products to be produced, $k_1$ represents a number of types of the first sub-products corresponding to the l-th type of products, m is an m-th type of first sub-products corresponding to the l-th type of products, and $x_m$ is an output of the m-th type of first sub-products; m is less than or equal to $k_1$ ($m \le k_1$), and m and $k_1$ are positive integers;

the second constraint condition on the material consumption of the first sub-products satisfies the formula:

$$0 \le \sum_{m=1}^{n_1} a_{mq} * x_m \le m_{qmax};$$

where $n_1$ is used to represent a number of types of the first sub-products; $a_{mq}$ represents a quantity of a q-th type of materials consumed by the m-th type of first sub-products, and $m_{qmax}$ is a supply of the q-th type of materials; and q is a positive integer.

5. The method according to claim 4, wherein the third constraint condition on the product output of the second sub-products satisfies the formula:

$$0 \le \sum_{t=1}^{k_2} x_t \le p_{lmax} - r_l;$$

where $k_2$ represents a number of types of the second sub-products corresponding to the l-th type of products, t is a t-th type of second sub-products corresponding to the l-th type of products, $x_t$ is an output of the t-th type of second sub-products, and $r_l$ is an output of the first sub-products corresponding to the l-th type of products to be produced in the first-stage production plan;

the fourth constraint condition on the material consumption of the second sub-products satisfies the formula:

$$0 \le \sum_{t=1}^{n_2} a_{tq} * x_t \le m_{qmax} - s_q;$$

where $n_2$ is used to represent a number of types of the second sub-products, $a_{tq}$ is used to represent a quantity of a q-th type of materials consumed by the t-th type of second sub-products, and $s_q$ is a consumption of a q-th type of materials required to produce the first sub-products in the first-stage production plan.

6. The method according to claim 3, wherein updating the constraint conditions of the linear programming model according to the first-stage production plan includes:
- determining an output of the first sub-products and a material consumption of the first sub-product in the first-stage production plan;
- determining the third constraint condition on a product output of the second sub-products according to the output of the first sub-products in the first-stage production plan; and
- determining the fourth constraint condition on a material consumption of the second sub-products according to the material consumption of the first sub-products in the first-stage production plan.

7. The method according to claim 1, wherein the objective function satisfies the formula:

$$obj = \max \sum_{i=1}^{n_1} w_i * x_i + \max \sum_{j=1}^{n_2} w_j * x_j;$$

where obj is an output of the products to be produced, and $n_1$ is used to represent a number of types of the first sub-products; i represents an i-th type of first sub-products, $x_i$ is an output of the i-th type of first sub-products, and $w_i$ is a weight value of the i-th type of first sub-products; $n_2$ is used to represent a number of types of the second sub-products; j represents a j-th type of second sub-products; $w_j$ is a weight value of the j-th type of second sub-products, and $x_j$ is an output of the j-th type of second sub-products; i is less than or equal to $n_1$ (i≤$n_1$), j is less than or equal to $n_2$ (j≤$n_2$); i and j are positive integers.

8. The method according to claim 1, wherein the linear programming model is a mixed-integer linear programming model.

9. The method according to claim 1, wherein updating the constraint conditions of the linear programming model according to the first-stage production plan includes:
determining an output of the first sub-products and a material consumption of the first sub-product in the first-stage production plan;
determining a third constraint condition on a product output of the second sub-products according to the output of the first sub-products in the first-stage production plan; and
determining a fourth constraint condition on a material consumption of the second sub-products according to the material consumption of the first sub-products in the first-stage production plan.

10. The method according to claim 1, wherein determining the first sub-products according to the material types includes:
determining materials required in a first stage, the materials required in the first stage including at least one type of the old materials of the first type, new materials of a second type, and target materials;
combining the materials required in the first stage to determine a plurality of first material formulas; and
determining that in the products to be produced, products to be produced that have a same material formula as any one of the first material formulas are the first sub-products.

11. The method according to claim 9, wherein determining the second sub-products according to the material types includes:
determining materials required in a second stage, the materials required in the second stage including the new materials of the first type, or the materials required in the second stage including the new materials of the first type and at least one type of the new materials of the second type and the target materials;
combining the materials required in the second stage to determine a plurality of second material formulas; and
determining that in the products to be produced, products to be produced that have a same material formula as any one of the second material formulas are the second sub-products.

12. A computer program product comprising computer program instructions that, when executed on a computer, cause the computer to execute the product production planning method according to claim 1.

13. A non-transitory computer-readable storage medium having stored thereon instructions, wherein when executed by a computer, the instructions cause the computer to execute the product production planning method according to claim 1.

14. A product production planning device, comprising: a processor and a memory for storing instructions executable by the processor; wherein the processor is configured to execute the instructions to implement the product production planning method according to claim 1.

15. A product production planning device, comprising: a processing unit, wherein
the processing unit is configured to determine material types of materials; the material types include a first type of old materials and a first type of new materials;
the processing unit is further configured to determine a production plan of products to be produced based on the old materials of the first type and the new materials of the first type included in the materials, according to a linear programming model and the material types;
the linear programming model includes a constraint condition and an objective function;
the production plan includes a first-stage production plan and a second-stage production plan, the first-stage production plan is a production plan for producing products to be produced according to the old materials of the first type, and the second-stage production plan is a production plan for producing product to be produced according to the new materials of the first type;
wherein the objective function is an objective function that maximizes a product output of first sub-products and maximizes a product output of second sub-products; the first sub-products are products planned to be produced in the first-stage production plan; and the second sub-products are products planned to be produced in the second-stage production plan;
wherein that the processing unit is further configured to determine a production plan of products to be produced according to a linear programming model and the material types includes:
determining the first sub-products and the second sub-products according to the material types;
allocating materials for the first sub-products according to the linear programming model to determine the first-stage production plan;
updating constraint conditions of the linear programming model according to the first-stage production plan; and
allocating materials for the second sub-products according to the updated linear programming model to determine the second-stage production plan.

* * * * *